United States Patent
Sprague

Patent Number: 5,992,449
Date of Patent: *Nov. 30, 1999

[54] PILOT OPERATED SAFETY RELIEF VALVE ADAPTED FOR LOW FLUID PRESSURES

[75] Inventor: Charles F. Sprague, Houston, Tex.

[73] Assignee: Groth Corporation, Houston, Tex.

[*] Notice: This patent issued on a continued prosecution application filed under 37 CFR 1.53(d), and is subject to the twenty year patent term provisions of 35 U.S.C. 154(a)(2).

[21] Appl. No.: 09/036,813

[22] Filed: Mar. 9, 1998

[51] Int. Cl.⁶ .................................................. F16K 31/12
[52] U.S. Cl. ..................... 137/488; 137/625.66; 137/492
[58] Field of Search ........................... 137/488, 492, 137/625.66, 625.27; 251/900

[56] References Cited

U.S. PATENT DOCUMENTS

| | | |
|---|---|---|
| 2,631,606 | 3/1953 | Parks . |
| 3,625,246 | 12/1971 | Reaves ..................................... 137/488 |
| 4,067,357 | 1/1978 | Ruchser .......................... 137/625.66 X |
| 5,555,910 | 9/1996 | Powell et al. . |
| 5,609,343 | 3/1997 | Asou et al. ..................... 137/625.66 X |

FOREIGN PATENT DOCUMENTS 694592  8/1940  German Dem. Rep. .

Primary Examiner—Denise L. Ferensic
Assistant Examiner—Joanne Y. Kim
Attorney, Agent, or Firm—Gary L. Bush; Mayor, Day, Caldwell & Keeton L.L.P.

[57] ABSTRACT

A safety relief valve (10) has a diaphragm actuator (24) including a diaphragm (26) with a dome chamber (34) on one side of the diaphragm (26) and an underdome chamber (36) on an opposed side of the diaphragm (26). A diaphragm operated pilot control valve (38) has a valve body (46) with a pilot sensing port (54), a pilot dome port (64), and a pilot underdome port (60) in fluid communication with a pilot valve chamber (52). A slidable pilot valve member (68) connected to diaphragm (42) is mounted for movement between two pairs of opposed annular seats (80, 84 and 82, 86). Actuation of pilot valve member (68) at a low set pressure permits fluid communication of inlet fluid from pressure vessel (15) to underdome chamber (36) and exhaust of fluid from dome chamber (34) to boost opening of main relief valve member (22).

17 Claims, 3 Drawing Sheets

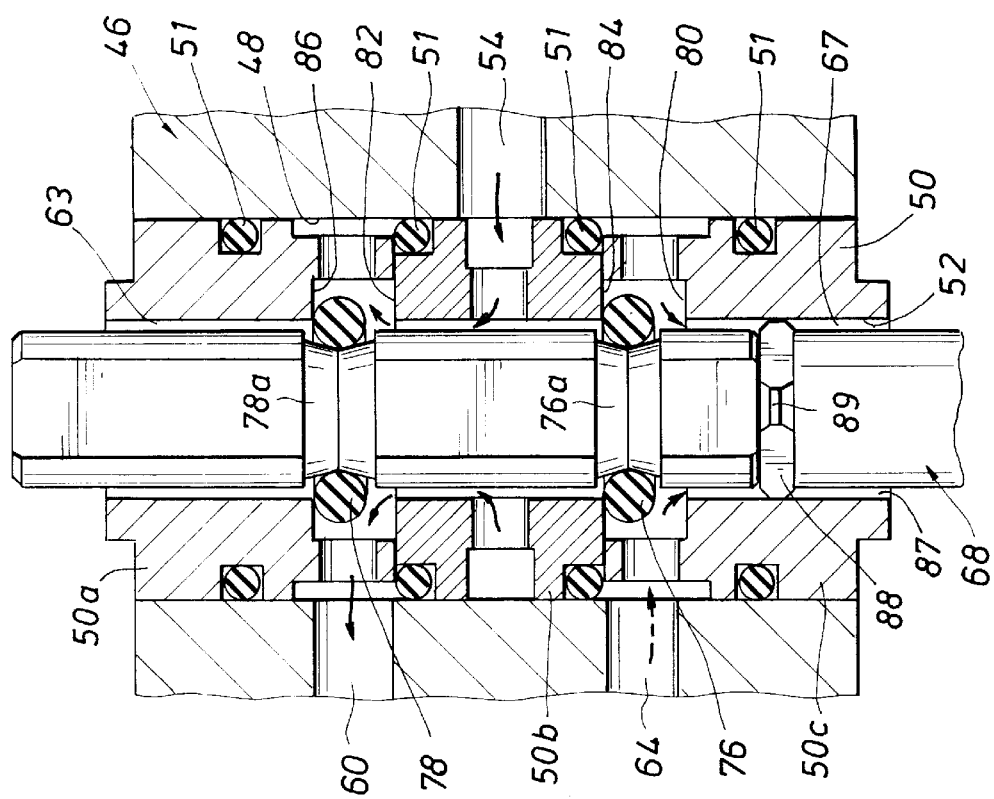
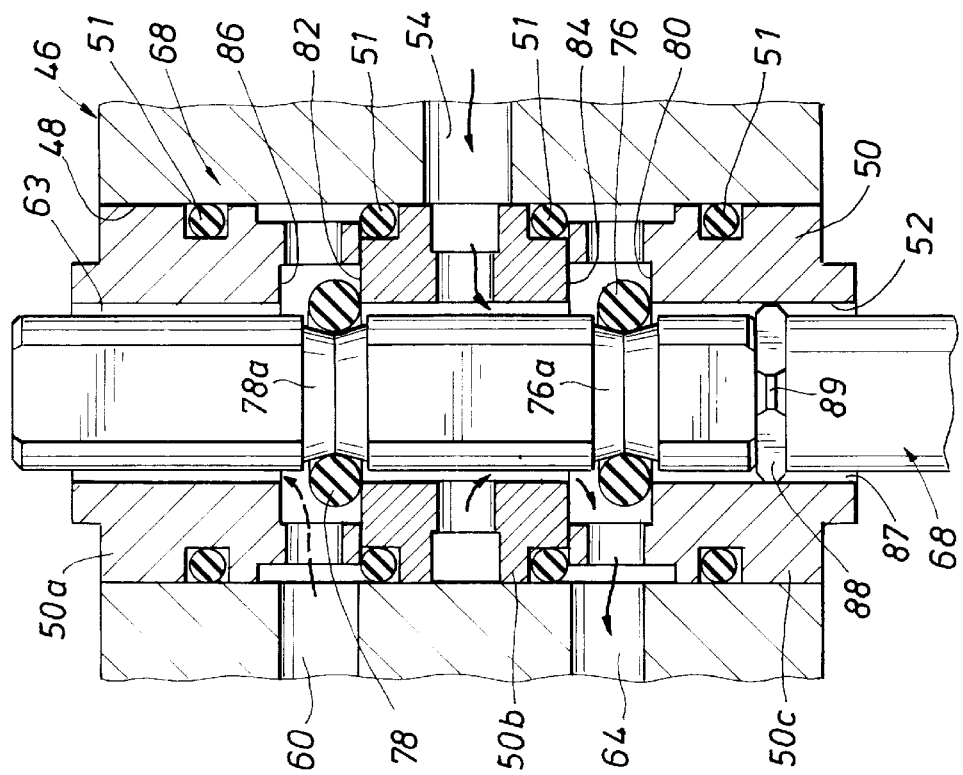

PILOT OPERATED SAFETY RELIEF VALVE ADAPTED FOR LOW FLUID PRESSURES

BACKGROUND OF THE INVENTION

1. Field of the Invention

This invention relates generally to pilot operated pressure relief valves to permit fluid flow from a pressure vessel at a predetermined fluid pressure in the pressure vessel, and is particularly directed to such relief valves adapted for a low fluid pressure operation. The main safety relief valve member has a diaphragm actuator connected thereto for movement with the main valve member and a pilot control valve is effective to control fluid pressure for the dome chamber on one side of the diaphragm and to control fluid pressure for the underdome chamber on the opposite side of the diaphragm.

2. Description of the Prior Art

Heretofore, in pilot operated pressure relief valves, the main valve member of the relief valve has utilized a fluid pressure responsive actuator including a diaphragm having a dome chamber adjacent the outer or upper side of the diaphragm and an underdome chamber adjacent the opposed lower or inner side of the diaphragm. Upon actuation of the pilot control valve, line or inlet fluid pressure is communicated to the underdome from the pressure vessel to provide a boost or auxiliary force for opening of the main valve member to overcome the seating force resulting from such factors as (1) the weight of the moving members, and (2) the resistance force of the bending of the diaphragm. Such an arrangement permits a minimum set pressure to be obtained as low as about ½ to 1 inch water column (wc). Thus, the use of inlet or lading fluid for the underdome of the main diaphragm effectively moves the diaphragm and connected main valve member at very low fluid pressures.

U.S. Pat. No. 5,555,910 dated Sep. 17, 1996, shows a pilot operated safety relief valve adapted for low pressure operation and providing line or inlet pressure to an underdome chamber beneath the diaphragm upon actuation of the pilot valve at a low fluid pressure. However, an underdome control valve for the underdome chamber separate from the pilot valve for the main valve member is required. The pilot valve is in communication with the dome chamber for controlling the movement of the main valve member. The separate underdome control valve is in fluid communication with the underdome chamber and has an underdome valve member to control fluid communication of the underdome chamber with the inlet or line fluid pressure. The separate underdome control valve member normally effects venting of the underdome chamber to atmosphere during normal operation. However, upon reacting of the set pressure, the separate underdome valve member permits communication of inlet fluid pressure to the underdome chamber to boost opening of the main valve member.

It is desirable that a single control valve be provided to control fluid flow to both the dome chamber and opposed underdome chamber of a diaphragm actuator for the main valve member of a pilot operated safety relief valve.

It is an object of the present invention to provide a pilot operated safety relief valve having a diaphragm actuator in which a single pilot valve is effective to control fluid flow for both the dome chamber and opposed underdome chamber of the diaphragm actuator for the main valve member without any auxiliary control valves.

SUMMARY OF THE INVENTION

Low pressure (under 15 psi) safety relief valves normally operate at pressures between 10 to 15 inches of water column (in wc). It is desirable, particularly with increased environmental concerns, that a safety relief valve be provided for operation at fluid pressures as low as ½ inch to 1 inch water column (1 in wc=0.036 psi). Many storage tanks have emission requirements in the 1–10 inch wc range. For many applications, particularly where environmental concerns permit only minimum emissions, it is desirable that a relief valve be responsive to opening fully at such lower fluid pressures.

The present invention is directed particularly to a pilot operated safety relief valve for a pressure vessel which is effective to control fluid flow to both the dome chamber and opposed underdome chamber of a diaphragm actuator without the utilization of any separate auxiliary control valves. The pilot valve includes a sensing diaphragm in continuous fluid communication with the pressure vessel and a pilot valve member connected to the sensing diaphragm for movement therewith. The pilot valve body has an upper dome port in fluid communication with the main dome chamber of the diaphragm actuator, a lower underdome port in fluid communication with the opposed underdome of the diaphragm actuator, and a sensing port in fluid communication with the pressure vessel. A pilot valve member secured to the sensing diaphragm is mounted within the valve body for movement between a normal position with the main valve member in a closed position and a pressure relief actuated position with the main valve member in open position at a fluid pressure in the pressure vessel above the set pressure.

In the closed position of the main valve member, the underdome chamber of the diaphragm actuator is vented to atmosphere through the underdome port in the valve body. When the set pressure of the pilot valve is reached, the pilot valve diaphragm moves upwardly with a simultaneous movement of the pilot valve member. Movement of the pilot valve member to an actuated position results in venting the main upper dome chamber to atmosphere and providing line or inlet pressure to the underdome chamber. Venting of the main dome chamber reduces the fluid pressure therein and simultaneously applying inlet fluid pressure to the underdome chamber increases the fluid pressure therein to result in a highly responsive pilot valve. Thus, a safety relief valve provided by the present invention is responsive to minimal fluid pressure as low as about ½ inch water column.

Other objects and features of the invention will become apparent from the following specification and drawings.

BRIEF DESCRIPTION OF THE DRAWINGS

FIG. 3 is an enlarged sectional view of the pilot valve of the present invention showing the pilot valve member in the normal closed position of the main relief valve member as shown in FIG. 1; and FIG. 4 is an enlarged sectional view of the pilot valve of the present invention showing the pilot valve member in the open position of the main valve member as shown in FIG. 2.

DESCRIPTION OF THE INVENTION
Safety Relief Valve

Figure 1:
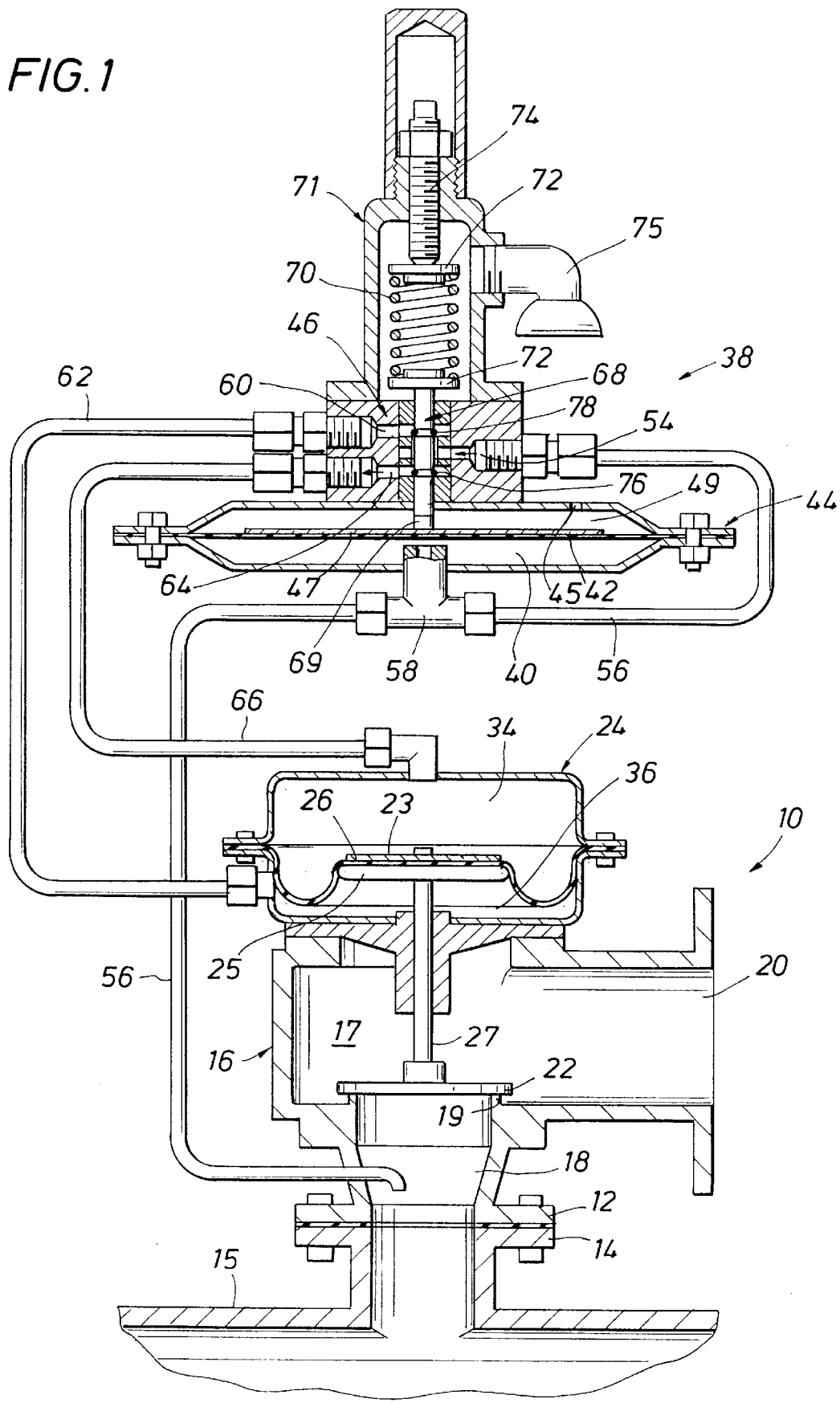
FIG. 1 is a sectional view of the pilot operated relief valve of the present invention in which a diaphragm actuator for the main valve member has a dome chamber on the upper side of the diaphragm and an underdome chamber on the opposed lower side of the diaphragm with the pilot valve in fluid communication with both chambers, and showing the main valve member in a closed position.
Figure 2:
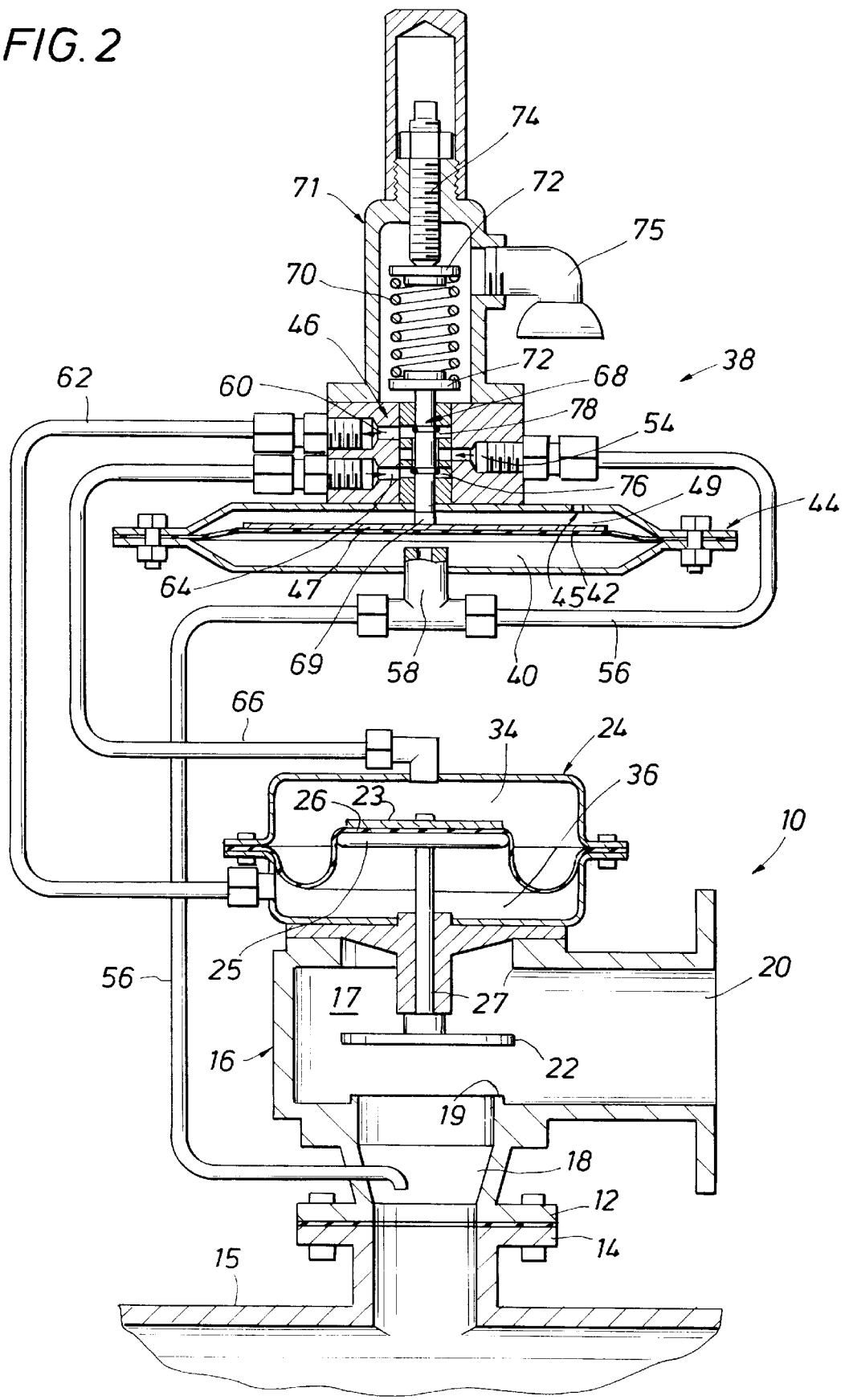
FIG. 2 is a sectional view of the pilot operated pressure relief valve of FIG. 1 but showing the main valve member in an open position for fluid pressure relief of the pressure vessel.

The present invention is particularly adapted for safety relief valve operable at fluid pressures as low as ½ to 1 inch of water column (in wc). Referring now to FIGS. 1 and 2, a pilot operated safety relief valve in accordance with the present invention is shown generally at 10 having a lower flange 12 secured to a mating flange 14 from a pressure vessel, such as tank 15. Valve 10 has a valve body 16 defining a body chamber 17 with an inlet 18 and a valve seat 19 about inlet 18. Inlet 18 is in continuous fluid communication with pressure vessel 15. An outlet 20 communicates with valve body chamber 17 and may be connected to a suitable drain line (not shown).

A main valve member comprising a valve disc 22 is adapted to seat on valve seat 19 in a normally closed position as shown in FIG. 1 blocking flow of fluid from inlet 18 and pressure vessel 15. A diaphragm actuator is shown at 24 having a diaphragm 26 sandwiched between plates 23, 25 and secured by means of a bolt threaded into rod 27. The diaphragm 26 may also be secured by an adhesive to plate 25. Rod or spindle 27 connects main valve member 22 and lower retainer plate 25. An upper dome chamber 34 is provided above diaphragm 26 and a lower opposed underdome chamber 36 is provided beneath diaphragm 26.

Pilot Control Valve

A pilot control valve is shown generally at 38 and has a sensing chamber 40 beneath diaphragm 42 gripped by mating housing sections of diaphragm housing 44 secured to pilot valve body 46. A diaphragm plate 47 is secured to diaphragm 42 and upper chamber 49 is vented to atmosphere by opening 45. Valve body 46 has a central bore 48 receiving a valve sleeve 50 therein having a bore defining a central valve chamber 52 as shown particularly in FIGS. 3 and 4. Sleeve 50 which is normally formed of multiple interfitting sleeve sections 50a, 50b, and 50c, as shown in detail in FIGS. 3 and 4 for assembly has O-rings 51 sealing sleeve 50 within central bore 48. The intermediate sleeve or seat section 50b defines peripheral recesses at each axial extremity thereof which receive O-ring type sealing elements 51 which establish sealing between the intermediate sleeve or seat section 50b and the cylindrical internal surface defining the central bore 48. The sealing elements 51 also establish sealing engagement with circular axial end surfaces of the sleeve sections 50a and 50c as shown in FIGS. 3 and 4 to isolate the pilot valve sensing port 54 from the pilot underdome port 60 and the pilot dome port 64. Other outer peripheral sleeve seals in the form of O-ring seals 51 effect sealing of the sleeve sections 50a and 50c with respect to the central bore 48 of the pilot valve body 46. A pilot valve sensing port 54 through body 46 and sleeve 50 is in fluid communication with valve chamber 52. A sensing line 56 from inlet 18 and pressure vessel 15 is in continuous fluid communication with pilot sensing port 54. Branch sensing line 58 extends to sensing chamber 40 beneath diaphragm 42 from inlet 18 and is in continuous fluid communication with pressure vessel 15. A pilot underdome port 60 through body 46 and sleeve 50 is connected to underdome line 62 from underdome chamber 36. A pilot dome port 64 through body 46 and sleeve 50 communicates with dome chamber 34 through dome line 66 extending from dome chamber 34.

An elongate pilot valve member indicated generally at 68 is mounted within valve chamber 52 for sliding movement between a normal operating position when main valve member 22 is in a closed position as shown in FIGS. 1 and 3 and an actuated position as shown in FIGS. 2 and 4. Pilot valve member 68 is connected to diaphragm 42 and plate 47 by a suitable fastener 69. A set compression spring 70 in a bonnet 71 secured to valve body 46 is compressed between upper and lower plates 72 to urge piston valve member 68 and diaphragm 42 downwardly. An adjusting screw 74 may be manually adjusted to control the force of the compression spring 70 against diaphragm 42 for the desired set pressure. A vent 75 is provided for bonnet 71.

Pilot valve member 68 has a pair of O-rings 76 and 78 which are adapted for sealing against respective seats 80 and 82 defined by annular shoulders of sleeve 50 in the normal operating position of FIGS. 1 and 3. O-rings 76 and 78 seal against respective seats 84 and 86 defined by annular shoulders of sleeve 50 in the actuated position of pilot valve member 68 as shown in FIGS. 2 and 4. In the normal operating position of FIGS. 1 and 3, dome line 66 and pilot dome port 64 are in fluid 10 communication with pilot sensing port 54 while underdome line 62 is vented to atmosphere through pilot underdome port 60 and upper annular space 63 about pilot valve member 68.

As shown particularly in FIGS. 3 and 4, the pilot valve member defines a pair of spaced seal grooves 76a and 78a within which the O-ring seals 76 and 78 are respectively received. Each of the spaced seal grooves 76a and 78a defines a V-shaped bottom groove surface which is basically defined by oppositely sloped conical surfaces which intersect intermediate the opposed shoulder surfaces of the seal grooves. Additionally, the opposed shoulder surfaces of each of the spaced seal grooves 76a and 78a are spaced wider than the diameter of the respective O-ring seal. The oppositely sloping conical bottom wall surfaces of each of the spaced seal grooves cause the respective O-ring seal, in absence of other forces acting on the seal, to be centered within its respective seal groove and to be disposed in sealing contact with each of the conical bottom wall surfaces and in spaced relation with the opposed shoulder surfaces of the respective seal groove.

It should be noted that annular seat shoulder 80 is defined by the lower sleeve section 50c of the sleeve 50 and the opposite annular seat shoulder 84 is defined by the axial end surface of the intermediate sleeve section 50b. It should also be noted that the seat shoulder surfaces 80 and 84 have greater spacing as compared to the diameter of the O-ring seal 76. This feature permits the pilot valve member 68 to be moved axially relative to the valve sleeve 50 for selective sealing engagement of the O-ring seal 76 with annular seat shoulder 80 or annular seat shoulder 84 at the respective operating positions shown in FIGS. 3 and 4. Likewise, annular seat shoulder 86 is defined by the upper sleeve section 50a and the opposite annular seat shoulder 82 of the annular seat groove for the O-ring seal 78 is defined by the intermediate sleeve section 50b. The annular seat shoulder surfaces 82 and 86 have greater spacing as compared to the diameter of the O-ring sealing element 78. Thus, the O-ring seals 76 and 78 are simultaneously moved by the pilot valve member 68 into selective sealing engagement with the upper or lower seat shoulders as depicted in the operational views of FIGS. 3 and 4.

In the actuated position of pilot valve member 68 as shown in FIGS. 2 and 4 with the set pressure exceeded, dome chamber 34 is vented to atmosphere through pilot dome port 64 and lower annular space 67 about pilot valve member 68 to upper chamber 49 and vent 45 to reduce the fluid pressure in dome chamber 34. Simultaneously, inlet fluid from pressure vessel 15 is communicated to underdome chamber 36 and diaphragm 26 through line 56, pilot inlet port 54, pilot underdome port 60, and underdome line 62 thereby to boost the opening force for main valve member 22.

The valve sleeve sections each define central bores which are disposed in registry and define the central valve chamber 52. The central bore 87 of the lower sleeve section 50c of the valve sleeve 50 is engaged by a centralizer element 88 which is carried by the pilot valve member 68 and serves to centralize and guide the pilot valve member with respect to the valve sleeve 50 as the pilot valve member is moved linearly within the valve sleeve between the operational positions shown in FIGS. 3 and 4. The centralizer 88 defines multiple contact sections such as shown at 89 for contact with the cylindrical internal surface 87 so that in the valve position shown in FIG. 4, flow of fluid is permitted in the annulus 90 that is defined between the outer peripheral surface of the pilot valve member and the internal cylindrical surface of the sleeve section 50c.

Operation

In operation with safety relief valve 10 in closed position as shown in FIGS. 1 and 3 and compression spring 70 set for a predetermined set pressure, an increase in fluid pressure in tank 15 as low at about ½ inch water column, diaphragm 42 is moved upwardly from an increase in pressure in sensing chamber 40 thereby to move pilot valve member 68 upwardly. Upward movement of pilot valve member 68 causes unseating of sealing members 76 and 78 from respective seats 80 and 82. Upon the unseating of sealing members 76 and 78, dome chamber 34 is vented to atmosphere through line 66, pilot dome port 64, annular space 67, and upper diaphragm chamber 49 thereby to reduce the fluid pressure in dome chamber 34. Simultaneously, inlet fluid pressure from tank 15 is communicated to underdome chamber 36 through line 56, pilot sensing port 54, pilot underdome port 60, and underdome line 62 thereby to increase the fluid pressure in underdome chamber 36 as shown in FIGS. 2 and 4. Main relief valve member 22 then moves to a full open position in a minimum of time.

Upon a reduction in fluid pressure in pressure vessel 15 below the set pressure, the fluid pressure in line 56 is reduced to reduce the fluid pressure in the diaphragm sensing chamber 40 thereby to return diaphragm 42 and pilot valve member 68 to the normal operating position of FIGS. 1 and 3.

From the above, it is apparent that a low pressure pilot operated safety relief valve for a pressure vessel has been provided that is responsive to a minimum set pressure as low as about ½ to 1 inch water column. The pilot control valve 38 utilizes a slidable pilot valve member 68 effective to control the fluid pressure for dome chamber 34 and underdome chamber 36 of the diaphragm actuator 24 for the main relief valve member 22. Underdome chamber 36 provides a boost to the full opening of main valve member 22.

While a preferred embodiment of the present invention has been illustrated in detail, it is apparent that modifications and adaptations of the preferred embodiment will occur to those skilled in the art. However, it is to be expressly understood that such modifications and adaptations of the preferred embodiment will occur to those skilled in the art and are within the spirit and scope of the present invention as set forth in the following claims.

What is claimed is:

1. In a pilot operated safety relief valve for a pressure vessel having a diaphragm actuator including a diaphragm connected to a main relief valve member, a dome chamber on the outer side of the diaphragm and an opposed underdome chamber on the inner side of the diaphragm;

an improved diaphragm operated pilot valve to control fluid pressure to the dome chamber and underdome chamber comprising:

a sleeve being located within said central bore and having an external wall surface;

a pilot valve body having a central bore having an external surface defining a pilot valve chamber and defining first and second pairs of spaced annular seats;

an elongate slidable pilot spool valve member mounted in said pilot valve chamber for linear sliding movement between a normal operating position at a predetermined operating fluid pressure and an actuated position at which said slidable spool valve member is at least a portion of said external surface of said spool valve member being disposed in spaced relation with said internal wall actuated at a low set pressure at least a portion of said external surface of said spool valve member being disposed in spaced relation with said internal wall and defining a fluid flow passage, a pair of annular seats being supported by said spool valve and have less dimension as compared with spacing of said spaced annular seats permitting each of said annular seats to selectively engage one of said spaced annular seats at said normal operating position and one of said spaced seats at said actuated position;

a diaphragm secured to said slidable pilot spool valve member for movement therewith and a sensing chamber on one side of said diaphragm for sensing inlet fluid from said pressure vessel;

a pilot sensing port in said pilot valve body communicating with said pilot valve chamber and in fluid communication with said pressure vessel;

a pilot underdome port in said pilot valve body communicating with said pilot valve chamber and in fluid communication with said underdome chamber; and a pilot dome port in said pilot valve body communicating with said pilot valve chamber and in fluid communication with said dome chamber;

said elongate slidable spool valve member in said central bore of said pilot valve body providing fluid communication of said dome chamber with said pilot sensing port and permitting venting of said underdome chamber to atmosphere in said normal operating position of said slidable spool valve member; and said slidable spool valve member in an actuated position above a low set pressure permitting fluid communication of said dome chamber to atmosphere and providing communicating of said pilot inlet port with said pilot underdome port to provide inlet fluid to said underdome chamber to boost the movement of said main diaphragm to an open position of said main valve member.

2. The improved diaphragm operated pilot valve as set forth in claim 1 wherein a fluid sensing line in fluid communication with said pressure vessel extends to said sensing chamber and to said pilot sensing port.

3. The improved diaphragm operated pilot valve as set forth in claim 1 wherein a fluid line extends from said dome chamber to said pilot dome port; and a separate fluid line extends from said underdome chamber to said pilot underdome port.

4. The improved diaphragm operated pilot valve as set forth in claim 1 wherein a sleeve is mounted within said pilot valve chamber and said pilot valve member is mounted within said sleeve for slidable movement.

5. The improved diaphragm operated pilot valve as set forth in claim 4 wherein said valve sleeve has a plurality of interfitting valve sleeve sections each disposed in sealing relation with said pilot valve body and defining a pair of axially spaced annular seat recesses each defined by spaced annular seats disposed for selective engagement by annular sealing elements carried by said elongate slidable pilot spool valve member at each operating position of said elongate slidable pilot spool valve member within said valve sleeve.

6. The improved diaphragm operated pilot valve as set forth in claim 5 wherein a pair of spaced O-rings are mounted about said pilot valve member for engaging said seats in sealing relation.

7. The improved diaphragm operated pilot valve as set forth in claim 1 wherein two pair of opposed annular seats are mounted in said pilot valve chamber, said pilot underdome port being between one pair of opposed seats and said pilot dome port between said other pair of seats.

8. The improved diaphragm operated pilot valve as set forth in claim 7 wherein said pilot sensing port is between said two pairs of seats and is in fluid communication with said pilot valve chamber at all times.

9. The improved diaphragm operated pilot valve as set forth in claim 7 wherein a pair of O-rings are positioned about said slidable pilot valve member between said pairs of opposed annular seats for sealing against said seats.

10. An improved diaphragm operated pilot control valve for a safety relief valve having a diaphragm actuator including a diaphragm with a dome chamber on one side of the diaphragm and an underdome chamber on the opposed side of the diaphragm; said improved diaphragm operated pilot control valve comprising:

a pilot valve body having a central bore defining a pilot valve chamber and an elongate slidable pilot spool valve member mounted in said pilot valve chamber for movement between a normal operating position at a predetermined operating fluid pressure and an actuated position at which said slidable pilot spool valve member is actuated at a low set pressure;

a diaphragm secured on one side to said slidable pilot spool valve member for movement therewith and a sensing chamber on the other side of said diaphragm for sensing inlet fluid from said pressure vessel;

a pilot sensing port in said pilot valve body communicating with said pilot valve chamber and in fluid communication with said pressure vessel;

a pilot underdome port in said pilot valve body communicating with said pilot valve chamber and in fluid communication with said underdome chamber; and a pilot dome port in said pilot valve body communicating with said pilot valve chamber and in fluid communication with said dome chamber;

a valve sleeve being located within said central bore and defining a plurality of axially spaced seal grooves each having O-ring sealing elements therein having sealing engagement with said central bore, said valve sleeve defining a pair of axially spaced annular seat recesses each being defined in part by axially spaced annular seats;

said elongate slidable spool valve member having a pair of axially spaced annular seal grooves each having an O-ring seal located therein for simultaneous selective sealing engagement with said axially spaced annular seats for providing fluid communication of said dome chamber with said pilot sensing port and simultaneously permitting venting of said underdome chamber to atmosphere in said normal operating position of said slidable valve member;

said slidable spool valve member in an actuated position above a low set pressure permitting fluid communication of said dome chamber to atmosphere and communicating of said pilot inlet port with said pilot underdome port to provide inlet fluid to said underdome chamber to boost the movement of said main diaphragm to an open position of said main valve member.

11. The improved diaphragm operated pilot valve as set forth in claim 10 wherein two pair of opposed annular seats are mounted in said pilot valve chamber, said pilot underdome port being between one pair of opposed seats and pilot dome port between said other pair of seats.

12. The improved diaphragm operated pilot valve as set forth in claim 11 wherein said pilot sensing port is between said two pairs of seats and is in fluid communication with said pilot valve chamber at all times.

13. The improved diaphragm operated pilot valve as set forth in claim 12 wherein a pair of O-rings are positioned about said slidable pilot valve member between said pairs of opposed annular seats for sealing against said seats.

14. A safety relief valve for a pressure vessel adapted to permit fluid flow from said pressure vessel at a predetermined fluid pressure in the pressure vessel; said safety relief valve comprising:

a main valve body having an inlet in fluid communication with said pressure vessel and an outlet leading from said valve body;

a main valve member within said valve body mounted for movement between open and closed positions relative to said inlet to permit fluid flow from said outlet upon movement of said valve member to an open position;

a diaphragm actuator for said main valve member including a housing and a main fluid pressure responsive diaphragm mounted within said housing, said main diaphragm connected to said main valve member for movement therewith between open and closed positions;

a dome chamber in said housing on the side of said diaphragm opposite said main valve member;

an underdome chamber in said housing on the opposite side of said diaphragm adjacent said main valve member;

a diaphragm operated pilot control valve having a pilot valve body connected to said main valve body and including a diaphragm housing having a sensing diaphragm therein defining a sensing chamber;

a sensing line from said inlet to said sensing chamber for continuously sensing the fluid pressure in said pressure vessel;

said pilot control valve having a body defining a generally cylindrical pilot valve bore and a valve sleeve being disposed within said generally cylindrical pilot valve bore and having sealing engagement therewith and defining a central valve chamber and defining axial spaced pairs of annular valve seats defining a pair of axially spaced annular seat recesses, an elongate slidable spool valve member mounted within said central valve chamber and being secured to said diaphragm on a side thereof opposite said sensing chamber for axial movement with said diaphragm, said elongate slidable spool valve having axially spaced annular sealing elements of less diameter than the spacing of said pairs of annular valve seats and being disposed respectively within said axially spaced annular seat recesses for selective sealing engagement with said annular valve seats responsive to positioning of said elongate slidable spool valve member within said valve sleeve;

a sensing port in said control valve body communicating with said pilot valve chamber, said sensing line extending downstream to said sensing port to provide inlet fluid to said pilot valve chamber;

a pilot underdome port in said pilot valve body communicating with said pilot valve chamber and in fluid communication with said underdome chamber; and a pilot dome port in said pilot valve body communicating with said pilot valve chamber and in fluid communication with said dome chamber;

said piston valve member in normal operating position with said main valve member closed providing fluid communication of said dome chamber with said sensing port and permitting venting of said underdome chamber to atmosphere;

said piston valve member in an actuated position with said main valve member open permitting fluid communication of said dome chamber to atmosphere and communicating said pilot inlet port with said pilot underdome port to provide inlet fluid to said underdome chamber to boost the movement of said main diaphragm and main valve member to an open position.

15. A safety relief valve as set forth in claim 14 wherein a plurality of sleeve sections defines said valve sleeve and forms said valve chamber, said plurality of sleeve sections defining two opposed pairs of annular seats therein arranged in a longitudinal spaced relation to each other to define an inner seat and an outer seat for each of said opposed pairs, said axially spaced annular sealing elements of said spool valve member in normal operating position seated on said lower seats in sealing relation and in an actuated position seated on said upper seats in sealing relation.

16. A safety relief valve as set forth in claim 15 wherein said spool valve member defines a pair of longitudinally spaced annular seal grooves each having O-ring sealing elements therein positioned between said opposed pairs of annular seats and selectively sealing against said seats at said normal operating position and said actuated position.

17. A safety relief valve as set forth in claim 14 wherein an adjustable spring set at a predetermined set pressure continuously urges said piston valve member and said sensing diaphragm in a direction toward said sensing chamber.

* * * * *